United States Patent [19]
Motohashi

[11] Patent Number: 4,805,323
[45] Date of Patent: Feb. 21, 1989

[54] SNOW REMOVAL DEVICE FOR VEHICLE

[75] Inventor: Yoshio Motohashi, Atsugi, Japan

[73] Assignee: Nissan Motor Co., Ltd., Yokohama, Japan

[21] Appl. No.: 90,927

[22] Filed: Aug. 31, 1987

[30] Foreign Application Priority Data

Sep. 1, 1986 [JP] Japan ............................... 61-205270
Jan. 6, 1987 [JP] Japan ............................... 62-480[U]

[51] Int. Cl.⁴ .......................... E01H 5/09; A47L 1/00
[52] U.S. Cl. ....................................... 37/254; 15/105;
15/250 R; 15/250.36; 37/257
[58] Field of Search ................. 37/244, 246, 253, 254,
37/255, 257; 15/4, 236 R, 105, 250 R, 250.05,
256.5, 256.52, 53 R, 250.36, 250.22

[56] References Cited

U.S. PATENT DOCUMENTS

| Re. 32,218 | 7/1986 | Kunert | 15/250 R |
|---|---|---|---|
| 1,459,614 | 6/1923 | Cohen | 15/250.36 X |
| 1,468,977 | 9/1923 | Schiesari | 37/255 |
| 2,144,317 | 1/1939 | Klaver | 37/257 |
| 2,277,528 | 3/1942 | Osborn | 15/105 X |
| 2,694,823 | 11/1954 | Kagan | 15/236 R |
| 2,784,437 | 3/1957 | Haas | 15/250.36 X |
| 3,056,487 | 10/1962 | Kipper | 37/257 |
| 3,115,715 | 12/1963 | Baldwin | 37/254 |
| 3,417,421 | 12/1968 | Retke | 15/105 X |
| 4,700,026 | 10/1987 | Kamiyama et al. | 15/250 |

FOREIGN PATENT DOCUMENTS

| 2021862 | 12/1971 | Fed. Rep. of Germany ... 15/250.05 |
| 54-51744 | 4/1979 | Japan . |
| 0076728 | 6/1980 | Japan ............................... 15/250 R |

Primary Examiner—Eugene H. Eickholt
Attorney, Agent, or Firm—Foley & Lardner, Schwartz, Jeffery, Schwaab, Mack, Blumenthal & Evans

[57] ABSTRACT

A snow removal device for a vehicle comprises an elongated casing provided adjacent to and extending along a lower edge section of a window glass and having a snow guide channel therethrough, a snow intake port facing the lower edge section and a pair of snow discharge ports each formed at either end of the snow guide channel. The snow guide channel receives snow entering the snow intake port and guides the snow toward to sides of the vehicle. A transfer device positioned in the snow guide channel moves the snow therein toward the snow discharge ports; and a drive device drives the transfer device, whereby the snow which is wiped from the lower edge section of the window glass by a wiper is removed through the pair of snow discharge ports.

13 Claims, 6 Drawing Sheets

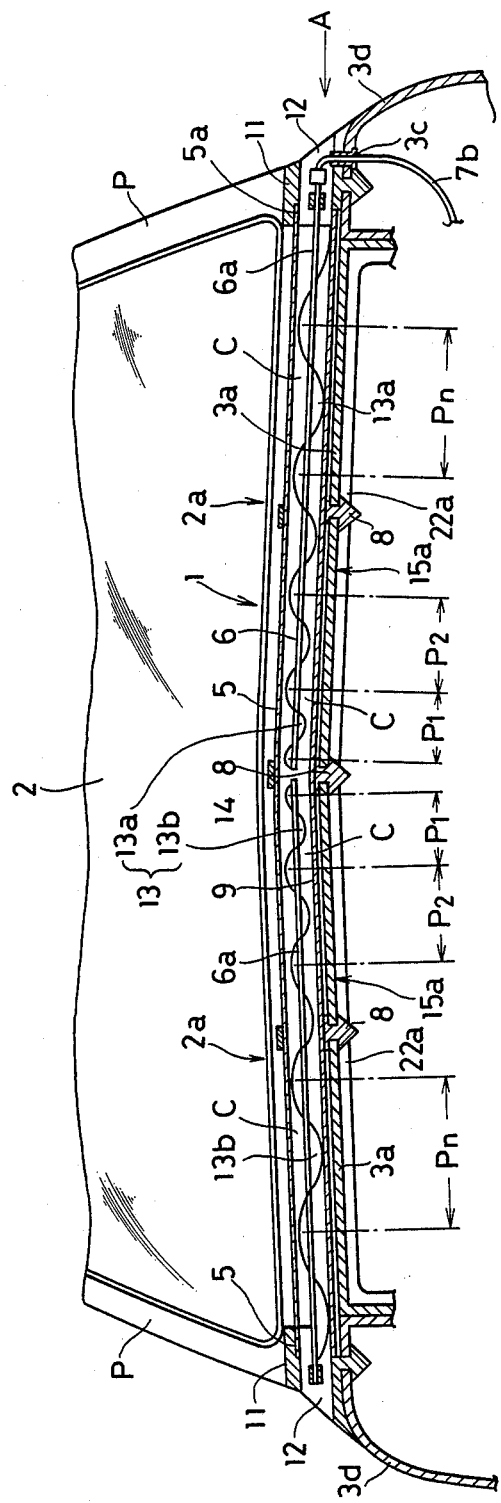

SNOW REMOVAL DEVICE FOR VEHICLE

BACKGROUND OF THE INVENTION

1. Field of the Invention

The present invention relates to a snow removal device for an automotive vehicle, and, more specifically, to a snow removal device for a vehicle wherein the snow which accumulates during snowfall on the lower part of the window glass of the vehicle, mainly as a result of the wiping action of the wipers, is effectively removed by the action of the snow removal device.

2. Description of the Related Art

Generally, when a vehicle such as an automobile travels when the snow is falling, the layer of snow which adheres to the front window glass or windshield is removed by the sweeping action of the wipers. However, when the external air temperature is especially low, or when the snowfall is particularly heavy, the snow wiped by the action of the wiper tends to accumulate at the bottom section of the front window glass, and this accumulated snow can freeze to the window due to the low temperature, making it difficult to ensure the field of vision of the driver.

An example of a device for eliminating such a condition is given in Japanese Patent Publication of Unexamined Application No. SHO-54-51744, "FRONT GLASS SNOW MELTING DEVICE". In this device, a hollow pipe connected to a source of heated fluid is positioned along the edge section of the lower part of the front glass or windshield, so that the snow accumulated on the lower part of the front glass is melted by means of the heat of warm fluid such as the engine cooling water which has been heated by the engine.

However, in this type of conventional "FRONT GLASS SNOW MELTING DEVICE", the temperature of the engine cooling water in the winter, specifically right after the engine is started, is low, as is the temperature of the outside air, and because the amount of heat contained in this engine cooling water is insufficient, a great deal of time is necessary to obtain the necessary amount of heat from the pipe to warm the edge section of the front glass or windshield and the moulding and the body portion near the edge portion and to melt the snow and ice adhering thereto Meanwhile, the glass part and the metal part is exposed to the outside air during the running of the vehicle, so that large amounts of heat are absorbed by the air from the parts. This means that a large device is required to supply enough heat over and above this absorbed heat. Further, the water resulting from the melting of one part of the ice and snow adhering to the edge section ends up being frozen to the cooled glass and metal portions such as the moulding next to the edge section. In addition, when there is a large volume of snow adhering to the front glass, e.g. during snowstorm or heavy snowfall, the snow on the area up to only about 10 mm from the hollow pipe would melt, but the snow flakes which have accumulated on the front glass, outside of this 10 mm, could not be melted and the range of the sweep of the wiper is gradually narrowed.

This creates a problem inasmuch as it is difficult for the wiper to operate smoothly, and the field of vision of the occupants of the vehicle cannot be ensured.

SUMMARY OF THE INVENTION

An object of the present invention is to provide, with due consideration to the drawbacks of such conventional devices, a snow removal device for a vehicle, wherein the snow accumulating on the lower edge section of the window glass or windshield can be removed by mechanically transferring the snow to the sides of the vehicle without melting.

Another object of the present invention is to provide a snow removal device for a vehicle which is effective even when the temperature of the engine cooling water is low after the engine has just been started up.

Another object of the present invention is to provide a snow removal device for a vehicle whereby the snow which has accumulated on the lower edge section of the window glass can be removed in a short time.

Another object of the present invention is to provide a snow removal device for a vehicle whereby even in the case when the vehicle is run when the temperature of the outside air is rather low, or when there is a large volume of snow falling, snow is prevented from accumulating on the lower edge section of the window glass, so that the field of vision of the driver of the vehicle can be ensured.

A further object of the present invention is to provide a snow removal device for a vehicle wherein, in the case where the vehicle is operated while the snow is falling heavily, the snow which has accumulated on the lower edge section of the front window glass can be more quickly and continuously removed, whereby the line of sight of the occupants of the vehicle is ensured, which contributes to the operating safety of the vehicle when snow is falling.

BRIEF DESCRIPTION OF THE DRAWINGS

These and other objects, features, and advantages of the present invention will become more apparent from the following description of the preferred embodiments taken in conjunction with the accompanying drawings, in which:

FIG. 7 is a structural configuration view of a third embodiment of the snow removal device of the present invention.

DETAILED DESCRIPTION OF THE PREFERRED EMBODIMENTS

An embodiment of a snow removal device for a vehicle of the present invention will be explained with reference to the drawings.

Figure 1:
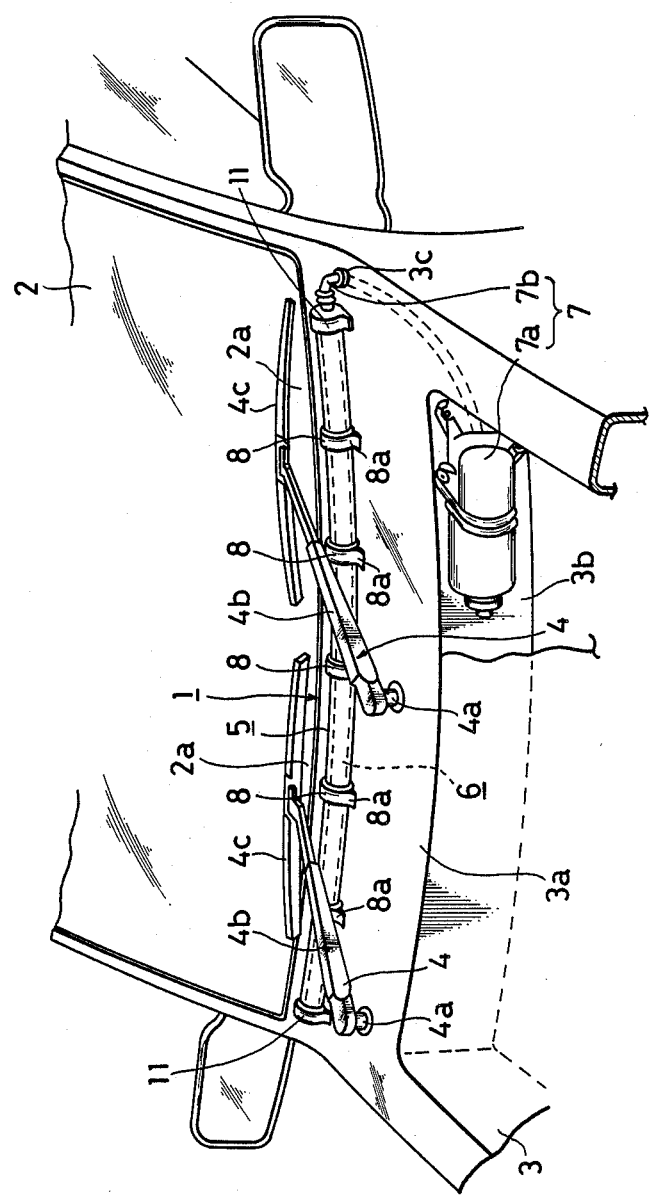
FIG. 1 is a perspective view of a first embodiment of the snow removal device of the present invention.
Figure 2:
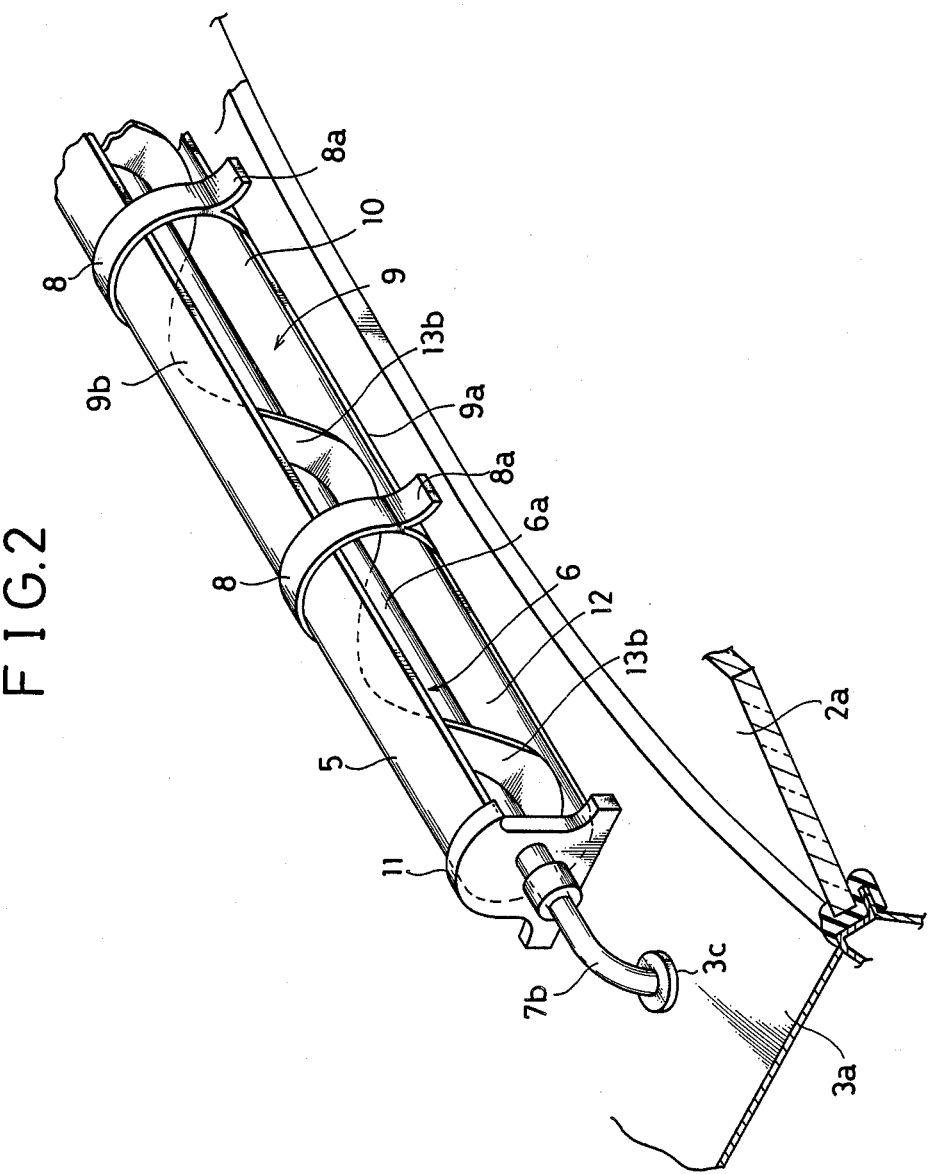
FIG. 2 is an enlarged perspective view of part of the embodiment of the snow removal device of the present invention shown in FIG. 1.

Now referring to FIG. 1, a snow removal device 1 of this embodiment of the present invention is mounted on a vehicle panel 3 in front of a front window glass or windshield 2 for an automobile. Specifically, the snow removal device 1 is set on a body panel 3, specifically cowl top 3a (also sometimes referred to as cowl top grill) which acts as a glass support section to support a lower edge section 2a of the front window glass 2. The snow removal device 1 of this embodiment is mounted on the cowl top 3a so that it extends in the width direction of the vehicle and is provided between a wiper pivot 4a of a wiper 4 which protrudes from the cowl top 3a and the front window glass 2. The snow removal device 1 is formed in a long, thin shape so that it does not obstruct the wiping action of a wiper arm 4b and a wiper blade 4c.

The snow removal device 1 of this embodiment of the present invention comprises an exterior casing 5 mounted on the cowl top 3a to act as a guide member, a screw rotor 6 provided in a rotatable manner inside the exterior casing 5 as a transfer means, and a drive means 7 which rotatably drives the screw rotor 6. The drive means 7 comprises a wiper drive device 7a as a drive source, and a cable 7b which transmits the drive power.

The snow which is scraped by the wiper 4 to the lower edge section 2a of the front window glass 2 is introduced into the casing 5. This snow in the casing 5 tends to be transferred toward the both sides of the vehicle body by the rotation of the screw rotor 6.

The external casing 5, as shown in FIG. 2 to FIG. 5, is supported in a clip 8 which is inserted by pressure into a mounting port 3e opened in the cowl top 3a, so that the casing 5 may be freely mounted on or removed from the cowl top 3a. A support portion 8a, which is positioned facing toward the front of the vehicle, is formed in the clip 8. Even when the snow is subjected to the wiping force of the wiper blade 4c and is pushed to the side of the cowl top 3a, the external casing 5 does not shift toward the front of the vehicle.

The external casing 5 is formed in the shape of a gutter extending parallel to the lower edge section 2a of the front window glass 2 which extends in the width direction of the vehicle. A snow guide channel 9 is provided which extends in the longitudinal direction of the external casing 5. A snow intake port 10 is provided in the snow guide channel 9 so that it opens facing the lower edge section 2a of the front window glass 2 and extends parallel to the lower edge section 2a of the front window glass 2. A lower port edge portion 9a of the snow intake port 10 in the external casing 5 extends slightly from the bottom portion closest to the cowl top 3a of the outer casing 5 toward the lower edge section 2a, so that the snow is transferred by means of the screw rotor 6 on the upper surface of the cowl top 3a without remaining any damage thereon. An upper port edge portion 9b of the snow intake port 10 in the external casing 5 extends slightly to the lower edge section 2a, so that the snow, which enters the outer casing 5 through the snow intake port 10 when the screw rotor 6 is rotating, is not whirled up in the upper direction of the cowl top 3a. The gutter-shaped snow guide channel 9 which is formed in the external casing 5 extends in the longitudinal direction of the external casing 5. When the external casing 5 is mounted on the cowl top 3a, the snow guide channel 9 is positioned so that it runs parallel to the lower edge section 2a of the front window glass 2. The screw rotor 6, which is used as a transfer means, is built into the snow guide channel 9 in parallel thereto. A pair of bearings 11 are provided, one at each end of the external casing 5 to support a rotary shaft 6a of the screw rotor 6. A snow discharge port 12 is provided in each end section in the longitudinal direction of the snow guide channel 9 to discharge to the car body sides the snow in the snow guide channel which is transferred by means of the screw rotor 6. In this embodiment of the snow removal device 1 of the present invention, the snow discharge port 12 and the snow intake port 10 are formed in a single opening.

Figure 4:
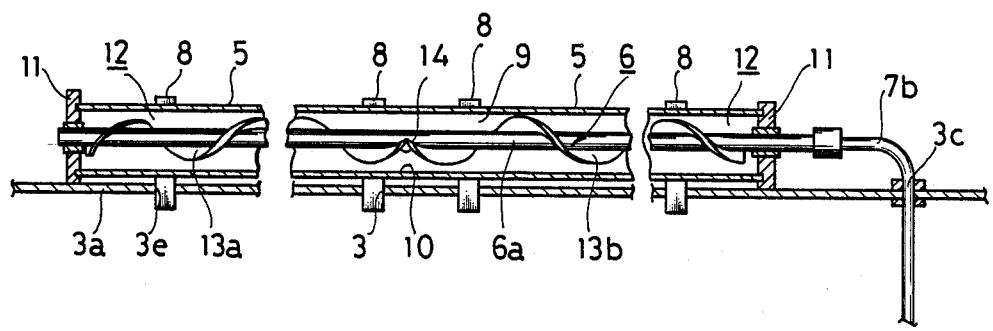
FIG. 4 is a sectional view showing the cross-sectional shape of an external casing and a screw rotor of the first embodiment of the present invention, viewed from the front side of the body.

The screw rotor 6 comprises the rotary shaft 6a which is supported by the bearings 11 of the external casing 5 and a spiral flight or blade section 13 which is formed at the periphery of the rotary shaft 6a. The spiral flight or blade section 13 is formed extending from one end to the other of the rotary shaft 6a. The rotary shaft 6a has a rotary axis common with the snow guide channel 9, which extends in the width direction of the vehicle. A bifurcated section 14 is formed in the center section of the spiral flight or blade section 13, as shown in FIG. 4, which splits and transfers the snow taken into the external casing 5 from the center section of the vehicle body toward each side of the vehicle. The two halves of the spiral flight section 13 on the opposite sides of the bifurcated section 14 spirally revolve in opposed directions. Specifically, a right side flight section 13a positioned on the right side of the body, on the left side in FIG. 1 and FIG. 4, are formed so that when the spiral flight section 13 is caused to rotate to the counterclockwise, viewed from the right side of the vehicle body, the snow in the guide channel 9 is transferred toward the right side of the vehicle. Also, a left side flight section 13b positioned on the left side of the body in FIG. 1 is formed so that, in the same way, hen the spiral flight section 13 is caused to rotate to the counterclockwise, viewed from the right side of the vehicle body, the snow in the guide channel 9 is transferred toward the left side of the vehicle. The end section, on the left side of the vehicle, of the rotary shaft 6a of the screw rotor 6 is connected to the cable 7b of the drive means 7, and on receiving the rotary force of the cable 7b, the spiral flight section 13 rotates within the guide channel 9.

In this way, when the snowflakes attached to the front window glass 2 are collected on the lower edge section 2a of the front window glass 2 as a result of the wiping section of the wiper 4, the snow which is gathered on the lower edge section 2a of the front window glass 2 is introduced into the guide channel 9 from the snow intake port 10. Then, because the right side flight section 13a and the left side flight section 13b are formed so that they extend in mutually opposite directions from the bifurcated section 14 formed in the center of the spiral flight section 13, when the spiral flight section 13 is made to rotate, the snow in the guide channel 9 is divided into two parts and transferred toward both sides of the vehicle. The snow inside the guide channel 9 is discharged from the snow discharge port 12 to the sides of the vehicle.

The external casing 5 e.g. of plastic made is flexible, and is positioned with an almost uniform spacing between it and the lower edge section 2a of the front window glass 2. In the same way, the screw rotor 6 is made of flexible plastic, so that it rotates smoothly, even when the external casing 5 is curved in parallel to the front window glass 2, and the snow inside the guide channel 9 does not freeze to the screw rotor 6.

Figure 5:
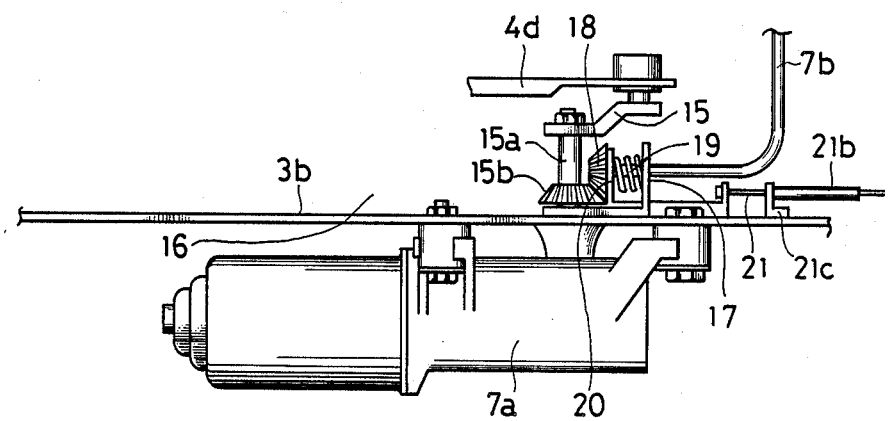
FIG. 5 is an explanatory view showing a wiper drive device and cable of the first embodiment of the present invention in the engaged status.

In this embodiment of the present invention, the drive means 7 comprise's a wiper drive device 7a as a drive source, and a cable 7b which transmits the drive power through a transmission means as follows: The wiper drive device 7a, as shown in FIG. 5, is mounted on a vertical wall section 3b on the engine compartment side of the cowl top 3a. A link lever 15 of the wiper drive device 7a is provided in an air box 16 below the cowl top 3a. The link lever 15 is provided with a shaft 15a which drives a link mechanism 4d, so that a wiper arm 4b swings through the medium of the link mechanism 4d. A gear 15b is provided on a shaft 15a. The gear 15b can be made to engage with a gear 18 which is rotatably supported on a bracket 17 provided in the air box 16 below the cowl top 3a. Interposed between the gear 18 and the bracket 17 are a spring 19 which is energized in the direction away from the bracket 17 causing the gear 18 to engage the gear 15b, and an operating plate 20 which compresses the spring 19 toward the bracket 17 to engage and disengage the gear 15b and the gear 18.

The operating plate 20 is supported in a freely sliding manner on the bracket 17, and has one end linked to the opposite end of a wire cable 21 provided on an instrument panel (omitted from the drawings) close to the driver's seat. A tube 21b, into which the cable 21 is inserted, has an end supported on a bracket 21c which is attached to a vertical wall section 3b on the cowl top 3a. At the driver's seat, when the cable 21 is pulled, the gear 15b and the gear 18 are disengaged, while when the cable 21 at the driver's seat is loosened, the gears 15b and 18 engage. Thus, the cable 21 can be maintained under tension at the driver's seat side for causing a gear 15b and a gear 18 to engage and disengage.

One end of the cable 7b is loosely inserted through the operating plate 20 and is linked to the gear 18, which can be extended or retracted with respect to the bracket 17. The other end of the cable 7b is inserted through a mounting hole 3c in the cowl top 3a, and is attached to one end of the rotary shaft 6a of the screw rotor 6. The cable 7b, when the gear 15b and the gear 18 are engaged, causes the snow which is taken into the guide channel 9 to be transported toward the sides of the vehicle by means of the spiral flight 13.

Figure 3:
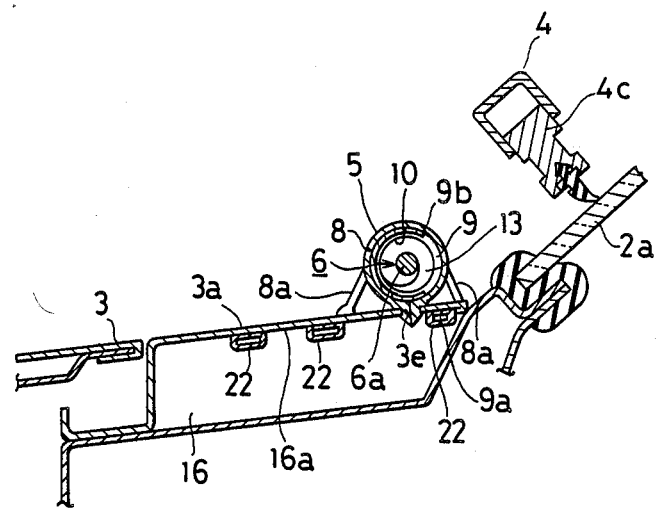
FIG. 3 is a sectional view of the first embodiment of the snow removal device of the present invention viewed from the vehicle body side.

On the lower wall surface 16a of the cowl top 3a facing the air box 16 as shown in FIG. 3, a pipe 22 is provided which communicates with the engine cooling system and through which the engine cooling water is passed. The pipe 22 is relatively unaffected by the outside air inasmuch as it is built within the side of the air box 16, so that the heating effect of the cowl top 3a is high, and the snow which is present between the external casing 5 and the lower edge section 2a of the front window glass 2 is readily melted, and made easy to transfer. In addition, the snow on the upper surface of the cowl top 3a is also melted. Specifically, the pipe 22 is provided for passing the engine cooling water on the lower surface of the cowl top 3a within the vehicle compartment, and the engine cooling water which passes through the pipe 22 is largely unaffected by the outside air, so that the heating effect on the cowl top is high. Accordingly, the snow between the external casing 5 and the lower edge section 2a is easily transferred, and the snow on the upper surface of the cowl top 3a can also be melted. In this way, the wiping action of the wiper blade 4c which wipes the front window glass 2 is prevented from being restricted to a narrow band, and even when it is snowing the driver's field of vision can be ensured. This contributes to the safe operation of the automobile vehicle during a snowfall.

Figure 6:
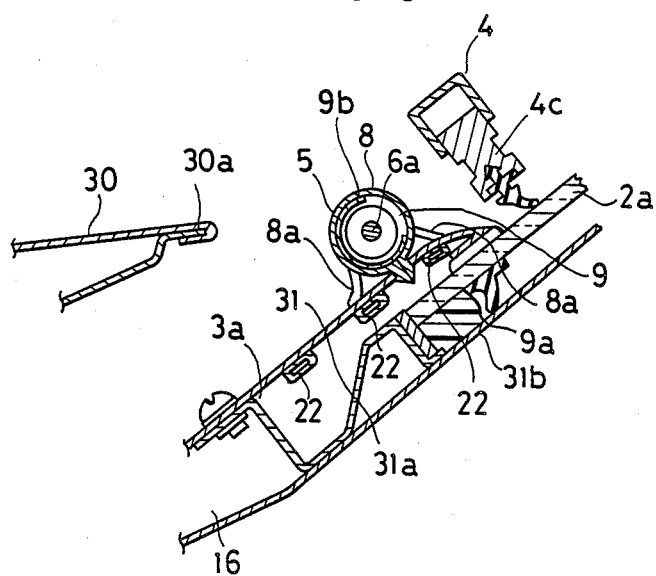
FIG. 6 is a sectional view of a second embodiment of the snow removal device of the present invention viewed from the vehicle body side.

FIG. 6 shows a second embodiment of the snow removal device 1 provided on a type of automobile on which the wiper 4, when not used, is housed under and concealed in the hood panel 30, and can not be seen when viewed from the front of the vehicle. In this embodiment of the present invention, a rear edge section 30a of the hood panel 30 extends close to the lower edge section 2a of the front window glass 2. The cowl top 3a is located below the rear edge section 30a of the hood panel 30. Formed on the cowl top 3a is a moulding 31 extending along the lower edge section 2a of the front window glass 2 to support the lower edge section 2a in cooperation with a flange 31b at the back of the cowl top 3a. The moulding 31 functions as a body panel. The snow removal device 1 is secured on the top of the moulding 31 of the cowl top 3a, so that it cannot be seen from the front of the body. The pipe 22, through which the engine cooling water is passed, is positioned on the back surface of the moulding 31 in the same way as in the case of the snow removal device of the first embodiment of the present invention, so that the snow between the lower edge section 2a and the external casing 5 easily enters the snow intake port 10, and the snow between the rear edge section 30a of the hood panel 30 and the moulding 31 can be easily eliminated. Both end sections of the external casing 5 in the width direction of the vehicle are curved slightly upward, so that the snow discharge port 12 is positioned on the top of the hood panel 30, and the snow is discharged to the sides of the vehicle. The structure of the rest of the device is identical to that of the first embodiment and is therefore omitted here.

In the first and second embodiments of the snow removal device for a vehicle of the present invention, the guide channel 9, snow inlet port 10, and snow discharge port 12 are formed in the external casing 5. The screw rotor 6 is positioned in the guide channel 9. The spiral flight section 13 is formed in the screw rotor 6. The bifurcated section 14 is formed at the central section of the spiral flight section 13. The spiral flight section 13 comprises a right flight section 13a and a left flight section 13b which spiral in opposite directions. The rotary shaft 6a of the screw rotor 6 is connected to the cable 7b which in turn is connected to the wiper drive device 7a. The cable 21 which is connected to the operating plate 20 is operated from the driver's seat for the engagement and disengagement of the gear 15b and the gear 18 and the connection and release of the cable 7b and the wiper drive device 7a. When the cable 7b and the wiper drive device 7a are connected, the screw rotor 6 rotates and the right flight section 13a and the left flight section 13b also rotate. Accordingly, the snow which is wiped to the lower edge section 2a of the front window glass 2 by the wiper blade 4c is fed into the guide channel 9 through the snow intake port 10 and is reliably discharged to the sides of the vehicle through the snow discharge port 12. Furthermore, the snow which is wiped to the lower edge section 2a of the front window glass 2 is transferred from the center of the vehicle and divided so that it passes to the two sides of the vehicle. Therefore, the case where the snow is transferred to one side of the vehicle only, and is inclined to accumulate on that side, is avoided.

In addition, the drive power to rotate the screw rotor 6 can be lower than if the snow were all transferred to the one side, for the metal pipe 22 positioned on the lower surface of the moulding 31 on the side of the cowl top grill 3a absorbs heat from the engine cooling water from the engine cooling system, so that it melts the snow on the moulding 31 and in the casing 5. The air from under the hood panel 30 is heated by the engine and acts as an air blast. The structure of the bearing which supports the end sections 5a of the casing 5 and the rotary shaft 6a of the screw rotor 6 is almost identical to that of the bearing 11 of the previous embodiments. However, the bearing is positioned on the moulding 31 and is formed so that it does not project from the top of the hood panel 30. A space between the discharge port (omitted from the drawing) at the bearing 11 and the surface of the moulding 31 at both sides of the body is sufficiently large for the molten snow to pass through. Further, it is also acceptable if the discharge port of the bearing which discharges the snow from the snow guide channel 9 opens facing the lower direction of the hood panel 30 and blows the heated air from the engine compartment onto the snow in the discharge port.

The snow removal device 1 in the first and second embodiments of the present invention was fabricated so that its length was roughly equal to the full width of the vehicle. However, this is not a limitation. For example, the snow removal device 1 may also be constructed as a pair of units—one for the right side of the front window glass or windshield 2 and one for the left side. Also, it is quite acceptable to only provide snow removal for the portion of the front window glass 2 which is directly in front of the driver's seat.

In addition, the snow removal device 1 can be mounted on the type of automobile that has a wiper installed for the rear window glass. In this case, the snow removal device 1 can be provided for the part of the snow that is piled up by the wiper, and the rotation of the spiral flight section 13 may be in one direction only. It is also acceptable to provide a motor on the external casing 5 which can be hooked up to the battery to supply power to the drive means.

Further, the transfer means is not limited to a type such as the screw rotor. A conveyor belt with a plurality of leaves or projections on its surface for moving the snow, running in the width direction of the vehicle, may also be used.

In the embodiments of the snow removal device of the present invention, when the snow is falling and the wiper performs a wiping action on the window glass extending in the direction of the width of the vehicle, wiping is performed by the wiper and the snowflakes are pushed to the lower edge section of the window glass.

The snow inlet port of the guide member on the lower edge section of the window glass, extends along the window glass, and faces toward the lower edge section of the window glass so that the snowflakes which have been pushed to the lower edge section of the window glass enter into the guide channel of the guide means from the snow inlet port.

A transfer means is provided in the guide channel. This transfer means moves in the direction of the snow discharge port which opens in the vehicle side section of the guide channel, so that the snow which has been taken into the guide channel is discharged from the snow discharge port on the sides of the vehicle body.

In addition, the spiral flight section faces the snow inlet port and runs along the guide channel. This spiral flight section rotates, so that, when the snow is pushed to the snow guide channel side from the snow inlet port by means of the wiping action of the wiper, the pushed snow is transferred in the direction of the width of the vehicle by means of the combined action of the spiral flight section and the guide channel.

At a point close to the center of the vehicle body, the spiral flight section is formed and extended in the mutually opposite directions. This spiral flight section is linked to a cable which is connected to a rotary means for driving the wiper. The spiral flight section therefore rotates, so that the snow which is in the guide channel is transferred to both sides of the body, so that the snow in the guide channel is transferred to the snow discharge port and is discharged from the snow discharge port to the sides of the vehicle.

Therefore, even when the engine cooling water temperature is low when the engine first starts, the snow removal device of the present invention removes in a short time the snow which has accumulated at the lower edge section of the front window glass. Even when the outside air temperature is rather low, or when there is an extremely large amount of snow falling, the snow is prevented from accumulating on the lower edge section of the window glass, and the field of vision of the passengers is ensured, which contributes to the safe operation of the vehicle.

Figure 8:
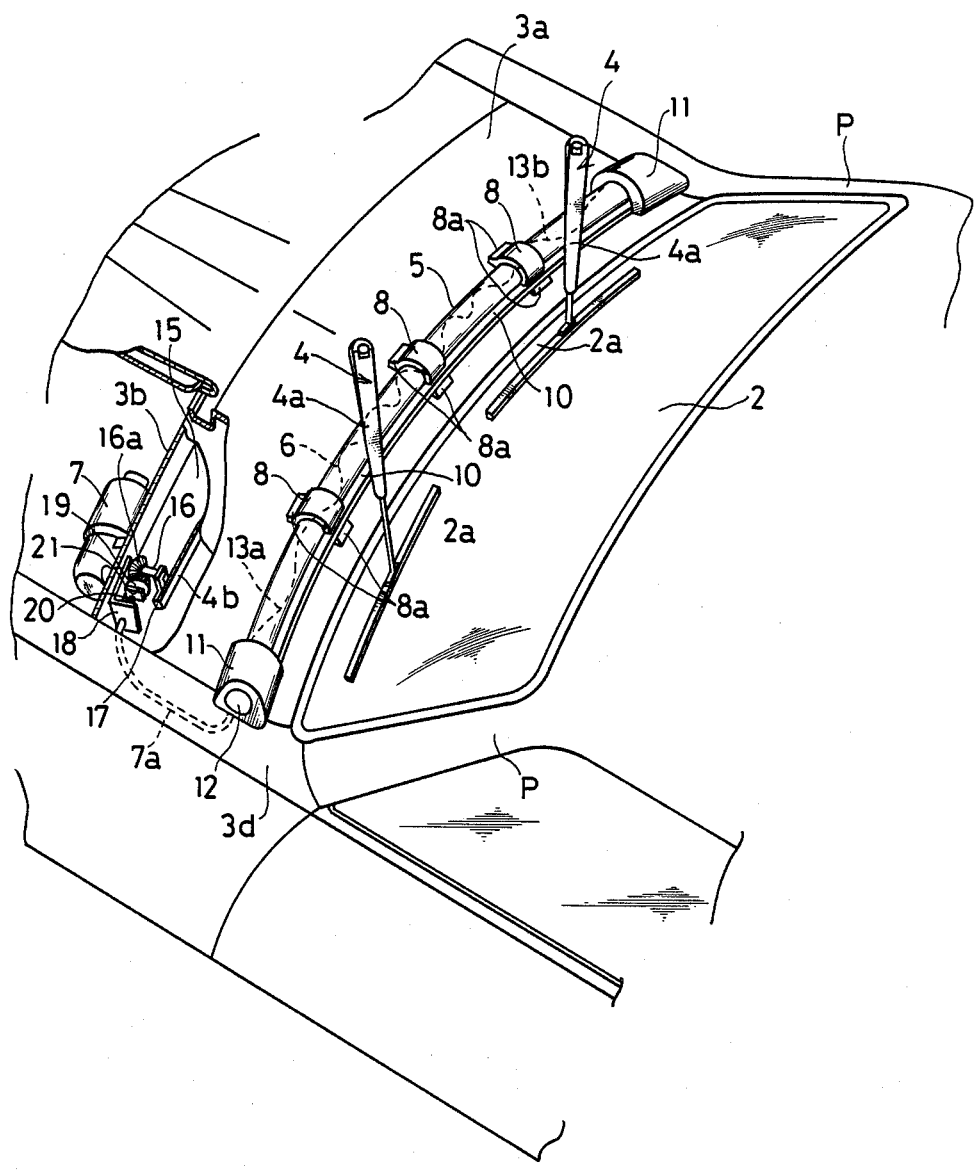
FIG. 8 is a side perspective view showing a snow removal device of the present invention positioned on a cowl top.

FIG. 7 and FIG. 8 show a third embodiment of the snow removal device of the present invention. The basic structure is identical to that of the first embodiment.

The snow removal device 1 is positioned on the cowl top or body panel 3a, and, as shown in FIG. 8, is positioned below the wiper arm 4a of the wiper 4. In the snow guide channel 9 in this embodiment, the central section of the vehicle body is slightly raised upwardly with reference to the vehicle body, and correspondingly a the cowl top grill 3a is slightly inclined toward both sides of the vehicle. The gap between the casing 5 and the cowl top grill 3a is extremely small. In order that the snow on the lower edge section 2a can be easily introduced, no gap is formed between the casing 5 and the cowl top grill 3a, and a gutter-shaped indented section is formed in the positioning of the case 5 on the cowl top grill 3a, so that the casing 5 may be secured on this indented section.

On both ends of the casing 5, as shown in FIG. 7 and FIG. 8, the bearing section 11 is provided which maintains both ends 5a of the casing 5 while rotatably supporting the rotary shaft 6a of the screw rotor 6. The discharge port 12 from which the snow in the guide channel 9 is discharged to the sides of the vehicle opens at the bearing section 11. In this embodiment of the present invention the bearing section 11 is secured to the top of the front fender 3d which is a part of the body panel. The discharge port 12 is positioned so that it opens at the side of a front pillar P.

Specifically, the flight or blade section 13a at the right side of FIG. 7 (the left side of the vehicle), viewed from the left side of the vehicle (the direction of the arrow A) rotates counterclockwise, so that, when the screw rotor 6 rotates, the snow in the guide channel 9 is transferred to the left side of the vehicle. In the same way, the flight section 13b at the left side of FIG. 7 (the right side of the vehicle), viewed from the right side of the vehicle (the opposite direction to the arrow A) rotates clockwise so that when the screw rotor 6 rotates, the snow in the guide channel 9 is transferred to the right side of the vehicle.

The pitch of the spiral flight section 13 gradually increases from the center of the vehicle to the sides—from a fine pitch at the center of the vehicle to a coarse pitch at the sides. Specifically, in this embodiment of the present invention, the pitch for the spiral flight section 13 at the center of the vehicle is indicated as Pl. The pitch at each of the sides of the vehicle is indicated as Pn. The pitch Pn is set so that $Pk+1 > Pk$ (where $k = 1, 2, 3, \ldots n$). The pitch Pl is the smallest pitch, while the pitch Pn at the sides of the vehicle is the largest pitch. In this way, a space C defined by the spiral flight section 13 and the inner surface of the snow guide channel 9, in which the snow is transferred, increases slowly in volume, from the center of the vehicle to the sides.

Accordingly, the volume of snow transferred for each rotation of the screw rotor 6 increases, and the capacity to discharge the snow from the snow guide channel 9 increases. Also, because the snow is transferred quickly, even though the volume of the snow in the guide channel 9 increases at the sides of the vehicle, while it is being transferred this snow is prevented from being packed in the snow guide channel 9 and from leaking out from the snow intake port 10.

In addition, the screw rotor 6 is made of a flexible plastic so that it rotates smoothly, even though the casing 5 is curved along the front window glass 2, and the snow within the snow guide channel 9 does not freeze to the screw rotor 6. The end of the rotary shaft 6a of the screw rotor 6 on the left side of the vehicle is connected to the wiper drive mechanism 7 and is connected to the rotatable cable 7a. On being subjected to the rotation of the cable 7a which is rotated by the wiper drive mechanism 7, the spiral flight section 13 rotates in the guide channel 9.

The cable 7b which is connected to the screw rotor 6 and to the gear 18 as in FIGS. 4 and 5 is inserted through a mounting hole 3c in a front fender 3d and is attached to the rotary shaft 6a of the screw rotor 6. When the gear 15b and the gear 18 are engaged as in FIG. 5, the spiral flight sections 13a, 13b rotate through the action of the cable 7b, and the snow which has been taken into the snow guide channel 9 is transferred to the discharge port 12.

In this embodiment of the snow removal device of the present invention, during snowfall, the snow on the front window glass is wiped by the wiper and is gathered up onto the top of the body panel which supports the lower edge section of the front window glass. A snow guide member provided in the snow guide channel is positioned on this body panel, and the snow guide channel of the snow guide member opens facing the lower edge section of the front window glass and extends over the width of the vehicle so that the snow gathered up by the wiper is guided by the snow guide means into the snow guide channel.

In the snow guide channel, the rotatable screw rotor is bearingly supported on an axis extending over the width of the vehicle. The spiral flight section of the screw rotor extends from the center of the vehicle across the width of the vehicle while rotating in opposite directions. Therefore, when the screw rotor is caused to rotate in the direction which transfers the snow to the sides of the vehicle from the center, the snow in the snow guide channel is transferred from the center of the vehicle to the sides by the combined action of the spiral flight section and the internal wall surfaces of the snow guide channel.

At that time, in the snow guide channel in which the snow is being transferred, a phenomenon is produced by which the volume of the snow being transferred from the vehicle center to its sides is increased because even more snow is introduced by the wiper. However, the pitch of the spiral flight section at the center of the vehicle is fine, and the pitch becomes coarser relative to the distance to the sides of the vehicle. Therefore, the space in which the snow built up on the spiral flight section and the inner walls of the snow guide channel is being transferred, is gradually expanded corresponding to the increase in volume of the snow. Accordingly, even when the snow being transferred in the snow guide channel increases in volume, the amount of snow transferred for each rotation of the screw rotor also increases, so that the snow is quickly moved out. Problems such as the snow becoming packed in, or overflowing from the snow guide channel are prevented.

In this embodiment of the snow removal device of the present invention, as stated in the above explanation, the spiral flight section at the center of the vehicle is formed with a fine pitch and the spiral flight section at the sides of the vehicle is formed with a coarse pitch. Therefore, the space in which the snow in the snow guide channel is transferred becomes increasingly larger from the center of the vehicle to the sides. As a result, the amount of snow transferred to the sides of the vehicle for each rotation of the screw rotor increases. Even when the vehicle is being operated while snow is falling heavily, the snow can be rapidly moved from the snow guide channel. Accordingly, the snow is prevented from becoming packed in, or overflowing from the snow guide channel, and difficulties in the rotation of the screw rotor are eliminated. Removal of the snow on the front window glass when the vehicle is being operated during snowfall can be accomplished quickly and continuously. This results in a clear field of vision being maintained for the occupants of the vehicle when snow is falling and contributes to the operating safety of the vehicle.

What is claimed is:

1. A snow removal device for a vehicle including window glass and a wiper therefor, comprising:
    an elongated casing provided adjacent to and extending along a lower edge section of the window glass and having a snow guide channel therethrough, a snow intake port facing said lower edge section and a snow discharge port formed in at least one end of said snow guide channel;
    said snow guide channel for receiving snow entering said snow intake port and for guiding said now toward said snow discharge port;
    a transfer means positioned in said snow guide channel to move said snow therein toward said snow discharge port; and
    a drive means which drives said transfer means;
    wherein said snow which is wiped from said lower edge section of said window glass by the wiper is removed through said snow discharge port.

2. The snow removal device for a vehicle of claim 1, wherein said snow removal device is positioned close to a glass support section which supports said lower edge section of said window glass on a vehicle body panel which extends over a width of said vehicle.

3. The snow removal device for a vehicle of claim 1, wherein said casing extends close to opposite sides of said vehicle and has said snow discharge port close to said opposite sides of said vehicle.

4. The snow removal device for a vehicle of claim 1, wherein said casing is formed with a bearing section at either end thereof, and said transfer means comprises a rotary shaft which is rotatably supported at each end by said bearing section and a spiral flight section formed around said rotary shaft and running generally through said snow guide channel.

5. The snow removal device for a vehicle of claim 4, wherein said casing has a pair of snow discharge ports each close to either side of said vehicle, and said spiral flight section comprises two halves connected to each other at a center of said snow guide channel and having flight turns in mutually opposite directions.

6. The snow removal device for vehicle of claim 1, wherein said drive means comprises a transmission means for receiving part of a rotation force from a means for driving said wiper, and a cable for transmitting said rotation force from said transmission means to said transfer means.

7. The snow removal device for a vehicle of claim 6, wherein said transfer means comprises a spiral flight section and a rotary shaft rotatably supported by said casing at opposite ends thereof, and said cable has one end thereof connected to said transmission means and the other end thereof connected to one end of said rotary shaft, wherein said spiral flight section is rotated by rotation of said cable, so that said snow is discharged from said guide channel.

8. The snow removal device for a vehicle of claim 1, wherein said transfer means comprises a screw rotor having a spiral flight section extending from a center section of said vehicle toward a driver side of said vehicle and is built in said snow guide channel in a freely rotatable manner around a rotary axis extending to said side of said vehicle.

9. The snow removal device for a vehicle of claim 4, wherein said spiral flight section has a varying pitch throughout said snow guide channel, such that it is fine at a location closer to a center of said vehicle in its width direction and coarser at a location closer to said snow discharge port of said channel.

10. The snow removal device for a vehicle of claim 2, wherein said snow removal device is positioned in a depression formed in said vehicle body panel, so that said snow removal device is positioned lower than the vehicle body panel.

11. The snow removal device for a vehicle of claim 2, wherein a metal pipe is attached to said vehicle body panel on the lower side thereof near said snow guide channel, whereby warm air from an engine of said vehicle flows through said pipe.

12. The snow removal device for a vehicle of claim 6, wherein said cable extends between said transmission means and said transfer means through a port formed in a body panel on which said snow removal device is placed.

13. The snow removal device for a vehicle of claim 6, wherein said cable extends between said transmission means and said transfer means through a port formed in a front fender adjacent to said snow removal device.

* * * * *